United States Patent [19]
Knutson et al.

[11] Patent Number: 5,665,910
[45] Date of Patent: Sep. 9, 1997

[54] LIQUID CHEMICAL APPLICATOR MEASURING DEVICE

[76] Inventors: Scott William Knutson, R.R. 1, Box 84; Curtis Jon Knutson, R.R. 1, Box 82, both of Fisher, Minn. 56723

[21] Appl. No.: 677,177

[22] Filed: Jul. 9, 1996

Related U.S. Application Data

[63] Continuation-in-part of Ser. No. 547,064, Oct. 23, 1995, abandoned.

[51] Int. Cl.⁶ .................................................. G01F 17/00
[52] U.S. Cl. .............................. 73/200; 73/149; 239/65
[58] Field of Search ........................ 73/200, 149, 296; 239/65, 172

[56] References Cited

U.S. PATENT DOCUMENTS

| | | | |
|---|---|---|---|
| 1,211,794 | 5/1917 | Von Lossau | 73/296 |
| 2,020,254 | 11/1935 | Chalatow | 73/296 |
| 2,037,879 | 4/1936 | Chalatow | 73/296 |
| 2,040,357 | 5/1936 | Chalatow | 73/296 |
| 2,383,269 | 8/1945 | Nairn | 73/149 |
| 2,821,854 | 9/1958 | Franke | 73/296 |
| 3,067,621 | 12/1962 | Fairhurst | 73/433 |
| 3,841,146 | 10/1974 | Cross et al. | 73/49.2 |
| 3,981,195 | 9/1976 | Forney et al. | 73/296 |
| 4,076,088 | 2/1978 | Gallo et al. | 177/210 R |
| 4,111,336 | 9/1978 | Ward et al. | 222/58 |
| 4,158,396 | 6/1979 | Suzuki et al. | 177/210 R |
| 4,385,672 | 5/1983 | Schepel | 177/207 |
| 4,476,946 | 10/1984 | Smith | 177/144 |
| 4,513,796 | 4/1985 | Miller et al. | 73/32 R X |
| 4,524,617 | 6/1985 | Krehel et al. | 73/296 |
| 4,605,297 | 8/1986 | Livingston et al. | 354/303 |
| 4,811,596 | 3/1989 | Wolfgang | 73/149 |
| 4,832,499 | 5/1989 | Fiorentini | 366/152 |
| 5,024,352 | 6/1991 | Gmür et al. | 222/1 |
| 5,033,449 | 7/1991 | Hanagan | 126/39 BA |
| 5,103,401 | 4/1992 | Johnson | 177/50 |
| 5,133,212 | 7/1992 | Grills et al. | 73/296 |
| 5,157,968 | 10/1992 | Zfira | 73/149 |
| 5,161,714 | 11/1992 | Neumann et al. | 222/55 |
| 5,301,555 | 4/1994 | Häfner | 73/861.04 |
| 5,406,970 | 4/1995 | Marshall et al. | 137/101.25 |
| 5,413,154 | 5/1995 | Hurst, Jr. et al. | 141/83 |

FOREIGN PATENT DOCUMENTS

| 2020045 | 11/1979 | United Kingdom | 73/296 |
|---|---|---|---|

*Primary Examiner*—Richard Chilcot
*Assistant Examiner*—Paul D. Amrozowicz
*Attorney, Agent, or Firm*—Curtis V. Harr

[57] ABSTRACT

A means of accurately measuring farm chemical during its application, through the use of load cell and a means of mounting this load cell to a sprayer apparatus is disclosed. The measurement of the chemical is accomplished by the use of a load cell which is mounted in a position below a keg of liquid farm chemical. The load cell measures the weight of the chemical keg and the liquid chemical contained therein. By knowing the specific gravity of the chemical being used and the weight of the keg itself, the operator can accurately compute the volume of chemical which has passed through the sprayer system and the rate of that passage. This gives the operator an accurate measure of the amount of the liquid chemical applied to each acre of crop land.

11 Claims, 6 Drawing Sheets

LIQUID CHEMICAL APPLICATOR MEASURING DEVICE

This application is a CIP of application Ser. No. 08/547,064, filed Oct. 23, 1995, now abandoned.

BACKGROUND OF THE INVENTION

The present invention relates to an improvement in the manner in which liquid farm chemicals are applied to crops in the field. More specifically, an apparatus for maintaining an accurate measurement of the amount of liquid farm chemicals applied to each acre of farm crop when mixed with water in that application by a chemical applicator.

As agriculture has evolved farmers have began using a variety of chemicals in order to optimize production. These chemicals include fertilizers, insecticides and herbicides. These chemicals come in a variety of forms, both liquid, solid and gas. This invention relates specifically to the application of liquid chemicals such as insecticides, herbicides or fertilizers.

Often times it is necessary to directly spray the leaves of a plant with a liquid chemical, this can be done either by air or by a ground applicator. When a ground applicator is used to apply chemicals, there has generally been two choices in controlling the amount of the liquid chemical that is applied.

The first method is to premix the liquid chemical with water, this is commonly referred to as tank mixing. Chemicals are received in a highly concentrated form and then diluted with water before spraying. When this method is used the person controlling the sprayer visually Watches the amount of chemical and water drop from the tank. Then, knowing the width of the sprayer and the length of the field the driver is able to calculate how much chemical is being applied to the crop. This is usually done on a volume per acre basis. This method has several disadvantages, the first being that once a tank has been mixed, it must be used before switching to another chemical or mixture. Secondly, it requires excessive calculations by the farmer in order to know the rate at which chemical is being applied. The final disadvantage, being that as these chemicals come in a highly concentrated form, they can be extremely dangerous and the use of tank mixing often requires that the farmer pour the chemical directly into the tank. This may result in hazardous spills. In response to the problems with tank mixing, systems for directly injecting chemicals into water before spraying have been developed. This brings us to the second form of controlling the amount of liquid chemical applied when ground spraying, the direct injection system. On a direct injection type sprayer, separate holding containers are used. The first container is a large water holding tank and the second is a smaller chemical tank. Often the chemical tank is merely the container in which the chemical is purchased. This may be a keg or barrel. A line is attached to the chemical tank and as the sprayer travels over a field the chemical is directly injected into a stream of water for mixing and finally, application to the crop. The problem with this method is, first, it can be very difficult to measure the amount of chemical that is being used and secondly, this often requires one to trust the settings on the applicator for accuracy. Finally, the accuracy of these settings cannot be checked until a substantial amount of ground as been covered in order to get a fair reading on the amount of chemical that has been used. In some instances, the operator will have to use a whole keg or container of undiluted chemical before the application rate can be accurately measured. In today's farm environment the cost of chemical and its effect on a crop is a substantial factor in whether a profit is made. Thus, there has been a great need for a method to accurately measure the rate at which chemical is being applied in a direct injection manor.

From the foregoing discussion, it can be seen that it would be advantageous to provide an apparatus for the measuring of a chemical on a direct injection type sprayer that could be instantly and accurately interpreted by the operator from the cab of the sprayer or tractor. The present invention addresses this problem by suppling a means of measuring the chemical by weight, as it is being used. The present invention also offers other advantages over the prior art and solves problems associated therewith.

SUMMARY OF THE INVENTION

In accordance with the present invention, an apparatus for measuring chemical by weight, as it is applied, is provided and further a mounting means for this apparatus is disclosed.

It is the primary objective of the present invention to provide a method and apparatus for maintaining an accurate measurement of the amount of liquid farm chemicals applied to farm crops. More specifically when these chemicals are directly injected for mixing with water, by a chemical sprayer, immediately prior to and during the application of the chemical and water unto crops.

This objective is accomplished by the use of a load cell, which is mounted in a position below a keg of liquid farm chemical. The load cell measures the weight of the chemical keg and the liquid chemical contained therein. By knowing the specific gravity of the chemical being used and the weight of the keg itself, the load cell may be equipped so that an operator can enter this information into the load cell computer. This would then convert this information into the volume of the chemical which has passed through the system and the rate of that passage. Finally, giving the operator an accurate measure of the amount of the liquid chemical applied to each acre of crop land.

In still another variation, the sprayer is equipped with a load cell attached to a strain gauge meter, which would allow the operator to gather information as to the weight of the remaining chemical and then manually calculate any needed information.

The goals of this system are typically accomplished by mounting a load cell to the accessory platform on a sprayer. This accessory platform is supplied with accessory bays, each of these bays may then in turn be supplied with a chemical keg retainer platform. It is understood that the type of bay and chemical retainer platform used, may vary with the type of keg or chemical container in which the chemical is supplied. The load cell is typically centered underneath the chemical keg retainer platform, so as to bear the full weight of the keg.

In some applications of chemical it may be required to mix one or more types of chemical with water prior to application. Accordingly, in this situation the sprayer may be equipped with multiple accessory bays, chemical keg retainer platforms and strain gauge meters.

A still further variation, would consist of the system when used with a self-propelled sprayer or other direct injection type chemical applicators.

The above-described features and advantages of novelty are pointed out with particularity in the claims of the present application. However, for a better understanding of the present invention, reference should be made to the drawings in which there is illustrated and described preferred embodiments of the present invention.

DESCRIPTION OF THE PREFERRED EMBODIMENT

Figure 1:
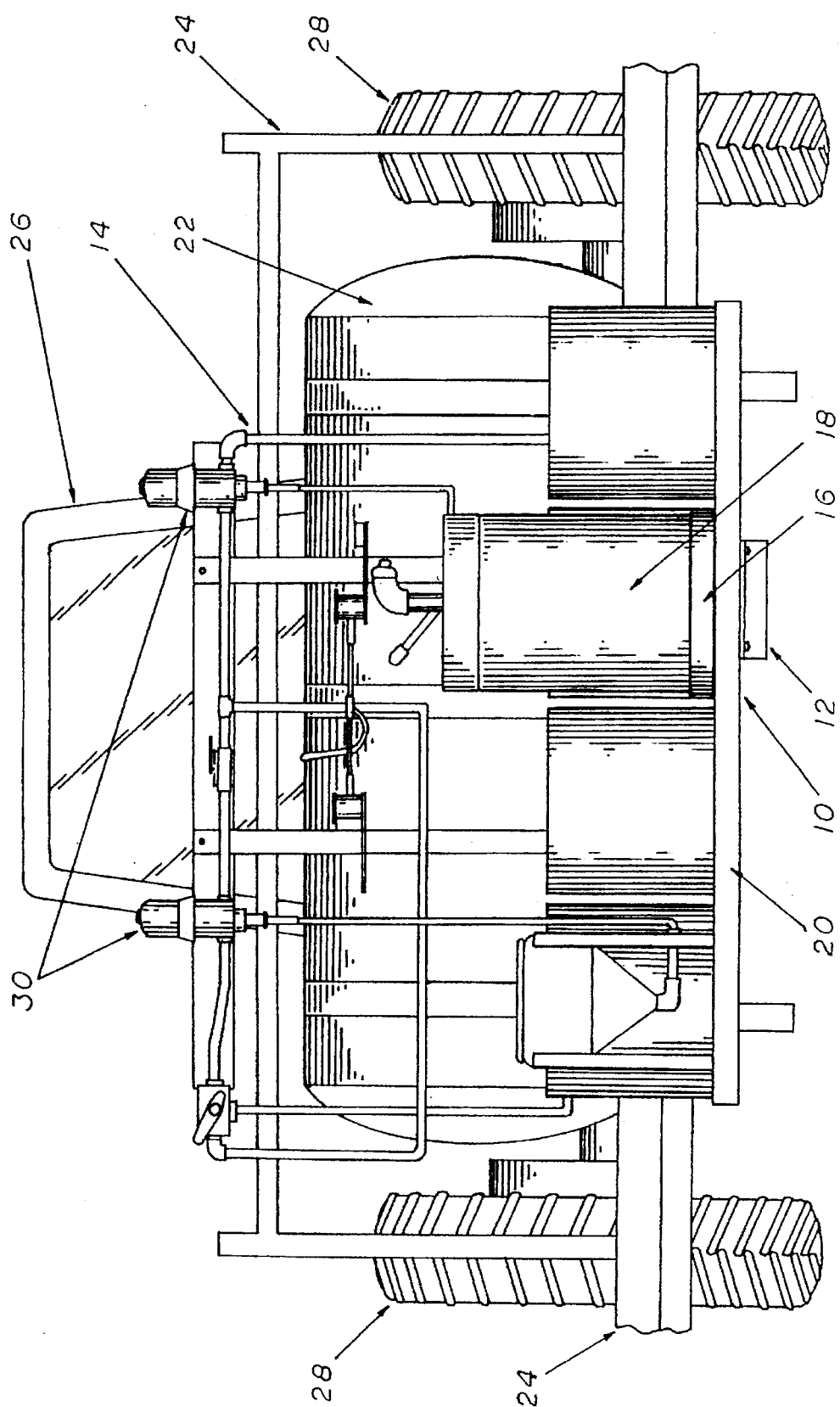
FIG. 1 is a front elevation view of the liquid Chemical Applicator Measuring Device showing the orientation of its major components when mounted on a farm tractor drawn chemical applicator.
Figure 2:
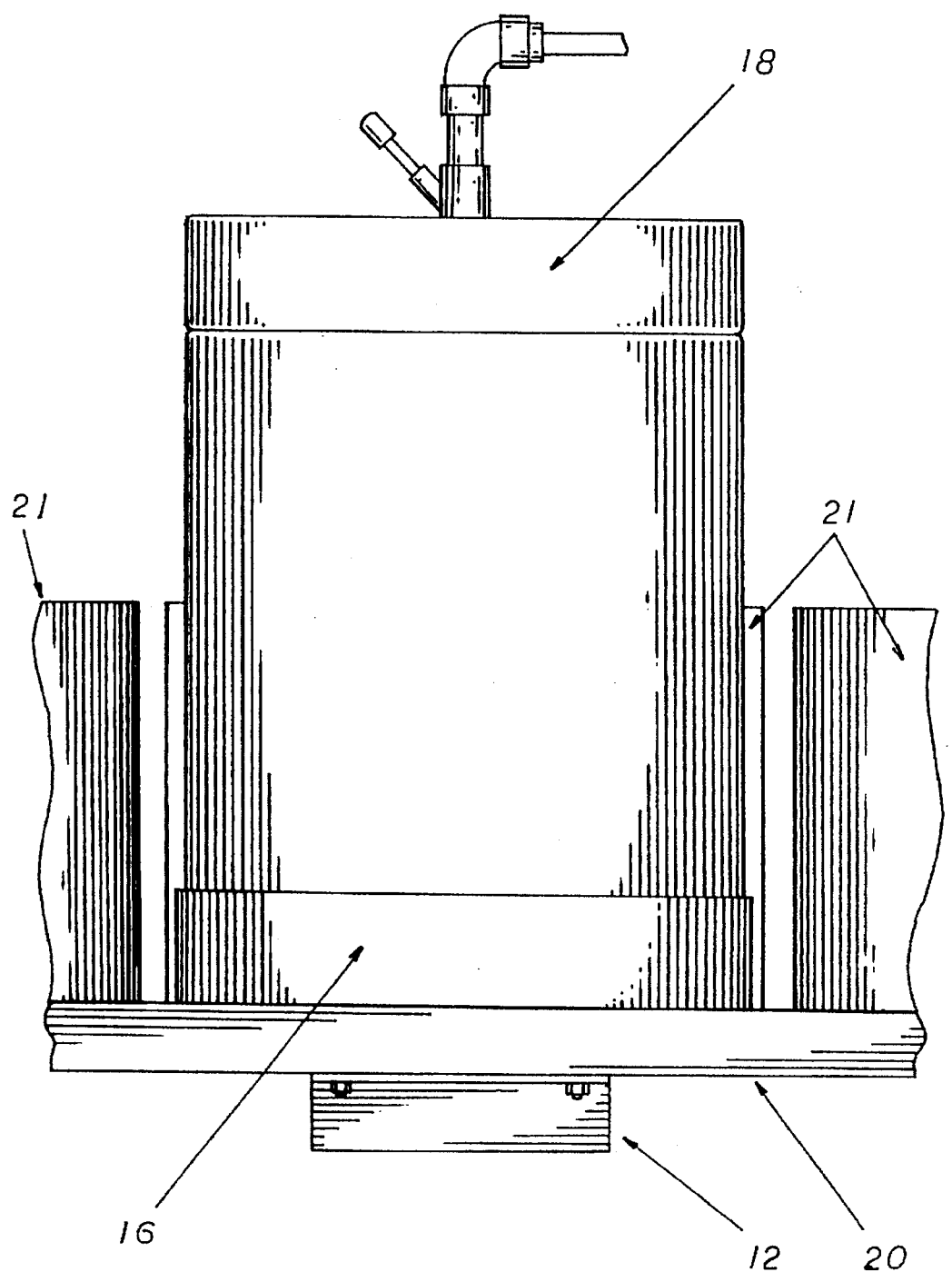
FIG. 2 is a front elevation close-up view of the present invention's weight measuring components showing the orientation of these components to one another.

Referring now to the drawings, and more specifically to FIGS. 1 and 2, the Liquid Chemical Measuring Device 10 is mounted to the accessory platform 20, which is mounted to the frame 24 of the farm chemical sprayer 14. This system is then pulled through the farm fields behind the farm tractor 26 by means of the rear drive wheels 28 during a farmer's crop spraying operations.

The load cell as mounted 12 is located below the accessory platform 20 and is connected directly to the chemical keg retainer platform 16, which in turn provides a point of securement for the chemical keg 18. This structure is mounted within one of the accessory bays 21 located on the accessory platform 20.

The liquid chemical is drawn from the chemical keg 18 and is then mixed with water from the sprayer water tank 22 by the chemical/water mixture regulators 30. This configuration allows the load cell as mounted 12 to continuously monitor the amount of liquid chemical remaining in the chemical keg 18. This is accomplished by entering the published specific gravity of the chemical being used into the present invention, thereby giving an accurate reading as to the amount of the liquid chemical that has passed through the system.

Figure 3:
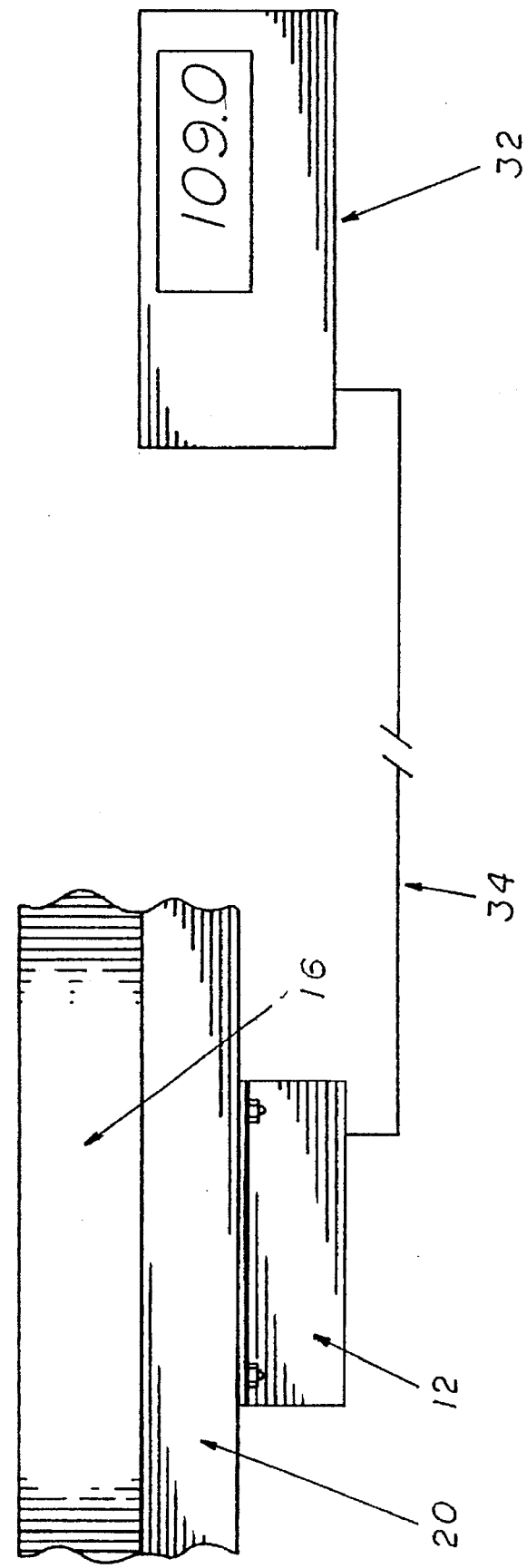
FIG. 3 is a front elevation close-up view of the present invention showing the manner in which the digital read out is connected to the weight measuring components.

As shown by FIG. 3, the weight remaining in the keg is displayed on the digital strain gauge read out 32 which located in a convenient location in the cab of the tractor 26, as shown in FIG. 1. Further referring to FIG. 3, the digital read out 32 is connected to the load cell as mounted 12, located beneath the accessory platform 20, and attached to the liquid chemical keg retaining platform 16, by means of the digital read out circuitry 34. This transfers the weight information gathered by the load cell as mounted 12 to the digital read out 32. This system gives the operator an accurate read out of the amount of chemical being applied at any given time and allows him to make any necessary adjustments as they may be needed.

Figure 4:
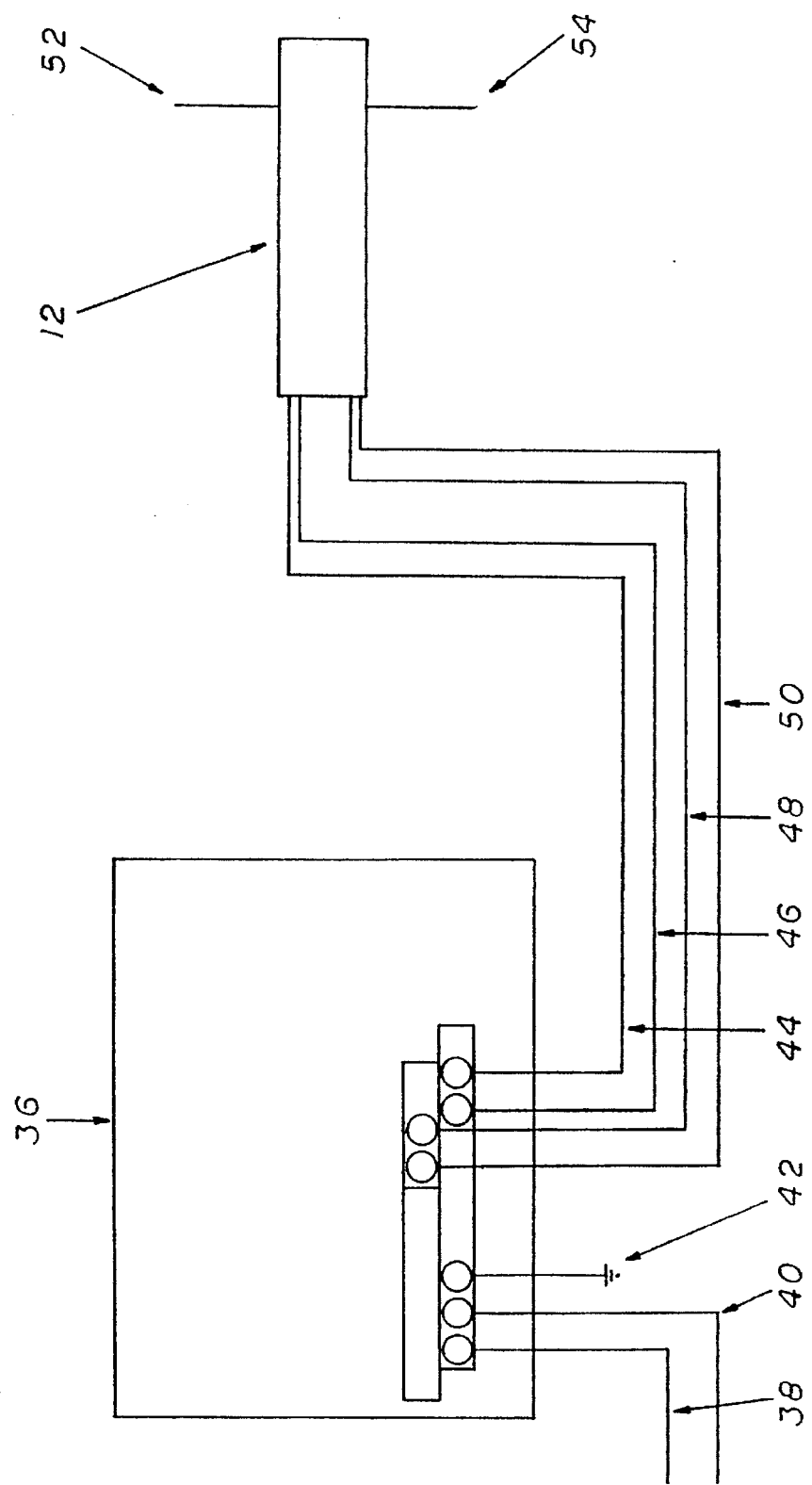
FIG. 4 is a schematic representation of the present invention's electrical system showing the manner in which the electrical circuitry of said invention is configured.

The load cell 12 is typically attached electrically to the strain gauge meter 36 as shown by FIG. 4. This connection may include optional leads 52 and 54 when a temperature correction is needed for accuracy. For normal temperature ranges the connections may consist of leads 48 and 50 which send an excitation voltage to the load cell 12. As stress is placed on the load cell 12 the resistance changes. The load cell 12 output is then sent through signal leads 44 and 46 to the strain gauge meter 36. The strain gauge meter 36 then processes this information and relays it to the digital read out 32 located in the cab of the tractor 26 with the strain gauge meter 36. This information is sent through the negative and positive digital read out leads 38 and 40. The circuitry of the strain meter 36 is grounded through ground wire 42.

Figure 5:
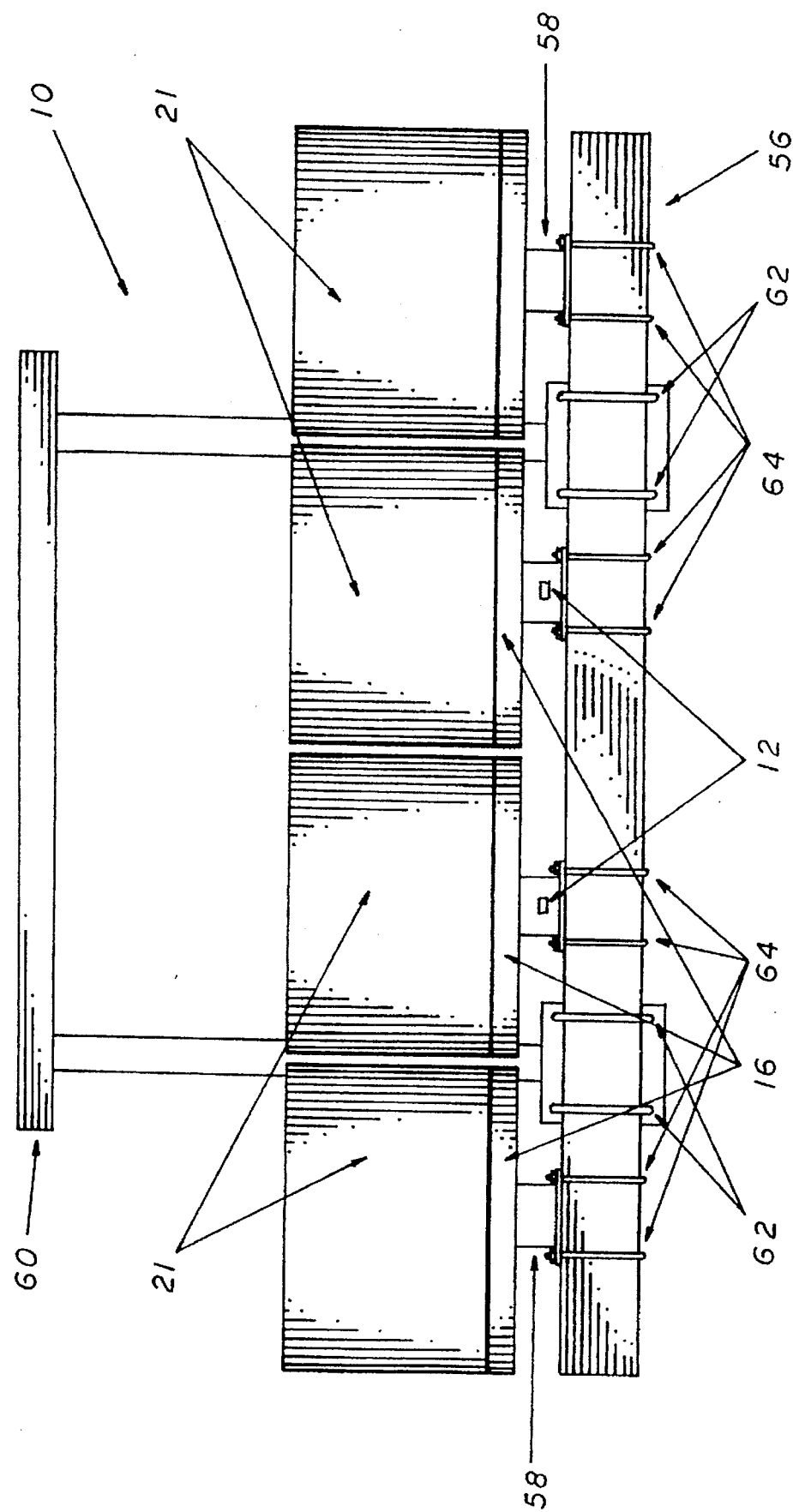
FIG. 5 is a front elevation view of the present invention showing another possible embodiment in which the accessory bays are mounted to an additional bar, instead of being mounted directly on the sprayer frame.
Figure 6:
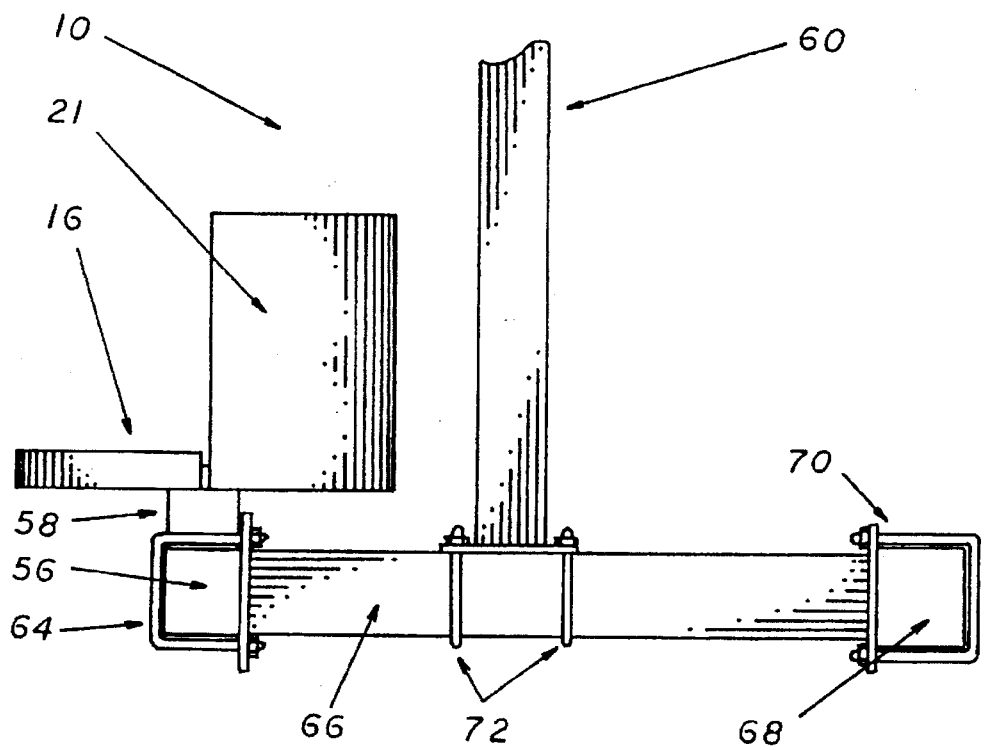
FIG. 6 is a side elevation view of the present invention showing the alternative embodiment illustrated in FIG. 5 and depicts the manner in which the accessory mounting bar extends rearward from the sprayer frame.

FIGS. 5 and 6 show another possible embodiment of the present invention, wherein the accessory bays 21 are mounted on a accessory bay mounting bar 56 by means of the accessory bay mounts 58. The load cells 12 are mounted within the accessory bay mounts 58, which are located between the accessory bays 21 and the accessory bay mounting bar 56. The accessory bay mounts 58 are secured to the accessory bay mounting bar 56 by means of the accessory bay U-Bolts 64.

The accessory bay mounting bar 56 is attached by means of the mounting bar U-Bolts 62 to the accessory bay extension frame 66 which is in turn mounted to the sprayer frame section 68 by means of the extension frame mounting U-Bolts 70. Additionally mounted to the accessory bay extension frame 66 is the regulator mounting frame 60, which is attached by means by the regulator frame U-Bolts 72.

Figure 7:
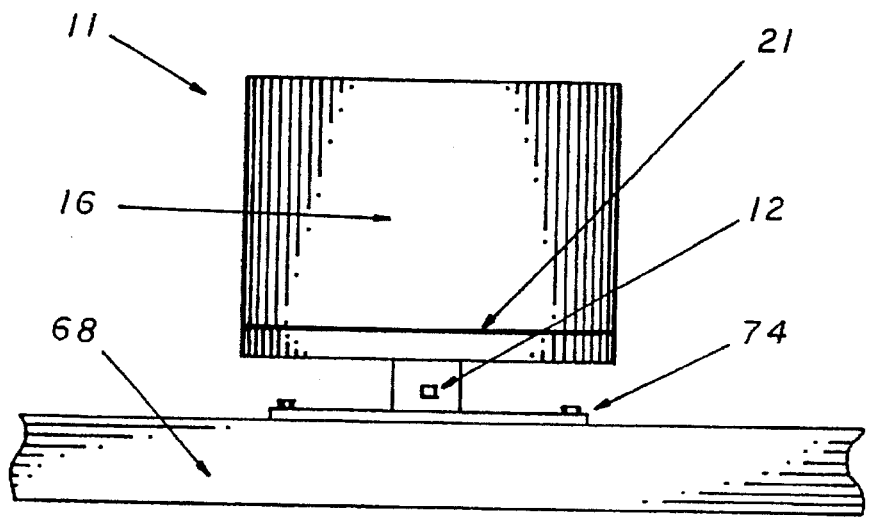
FIG. 7 is yet another embodiment of the present invention showing a single accessory bay mounted directly to the sprayer frame.

FIG. 7 shows an additional embodiment of the present invention in which a single mounted chemical application unit 11 is attached directly to the sprayer frame section 68. In this configuration, the accessory bay 21 and the load cell 12 are mounted on a single mount platform 74, which is bolted directly to the sprayer frame section 68.

Although the present invention has been described in considerable detail with reference to certain preferred versions thereof, other versions are possible. For instance the equipment just described may be contained on a single self-propelled sprayer. Or various versions of commercially available strain gauge may be used. Therefore, the spirit and scope of the appended claims should not be limited to the description of the preferred versions contained herein.

What is claimed is:

1. An agriculture chemical application unit with chemical measuring device comprising:

A direct injection sprayer unit having a separate water holding tank and chemical holding tank said sprayer unit being powered by an attached tractor;

An accessory bay mount;

A load cell fixably mounted inside said accessory bay mount;

A means of attaching said accessory bay mount to said sprayer unit;

A strain gauge display mounted in said tractor;

A connection means between said strain gauge display and said load cell with a second connection to a electrical power supply; and A means for removably mounting said chemical tank on said load cell above said accessory bay mount.

2. An agriculture chemical application unit with chemical measuring device as in claim 1 wherein said chemical holding tank is a keg.

3. An agriculture chemical application unit with chemical measuring device as in claim 2 wherein said means for removably mounting said keg on said load cell comprises a chemical keg retainer ring and a retainer platform fixably mounted to an accessory bay on said sprayer unit.

4. An agriculture chemical application unit with measuring device as in claim 3 wherein said unit further comprises an accessory bay mounting bar and said means of attaching said accessory bay mount to said sprayer unit is by fixably attaching said mount to said mounting bar.

5. An agriculture chemical application unit with chemical measuring device comprising:

A direct injection sprayer unit having a separate water holding tank and chemical holding tank said sprayer unit having a built in drive means and cab;

An accessory bay mount;

A load cell fixably mounted inside said accessory bay mount;

A means of attaching said accessory bay mount to said sprayer unit;

A strain gauge display mounted in said sprayer cab;

A connection means between said strain gauge display and said load cell with a second connection to a electrical power supply; and A means for removably mounting said chemical tank on said load cell above said accessory bay mount.

6. An agriculture chemical application unit with chemical measuring device as in claim 5 wherein said chemical holding tank is a keg.

7. An agriculture chemical application unit with chemical measuring device as in claim 6 wherein said means for removably mounting said keg to said load cell comprises a chemical keg retainer ring and a retainer platform fixably mounted to an accessory bay on said sprayer.

8. An agriculture chemical application unit with measuring device as in claim 7 wherein said unit further comprises an accessory bay mounting bar and said means of attaching said accessory bay on tot to said sprayer unit is by fixably attaching said mount to said mounting bar.

9. A method of determining and monitoring the amount of chemical being applied to a crop by a direct injection type sprayer having separate chemical and water tanks comprising the steps of:

(a) mounting a load cell to the sprayer;

(b) mounting the chemical tank to said load cell;

(c) powering the sprayer by an attached tractor, or by providing the sprayer with a built in drive unit and cab;

(d) taking a first reading from said load cell;

(e) directly injecting chemical from said chemical tank into a stream of water from said water tank;

(f) applying said chemical in said stream of water to a crop over an area Y;

(g) taking a second reading from said load cell; and (h) calculating the amount of chemical used from the first and second readings from said load cell.

10. A method of determining and monitoring the amount of chemical being applied to a crop by a direct injection type sprayer as in claim 9 further comprising:

(i) calculating the amount of chemical used per unit of area Y.

11. A method of determining and monitoring the amount of chemical being applied to a crop by a direct injection type sprayer as in claim 10 further comprising the steps of:

(j) adjusting the rate of chemical applied by the direct injection sprayer as necessary; and (k) repeatedly preforming steps (c) through (i) as necessary.

* * * * *